(12) United States Patent
Waespe

(10) Patent No.: US 6,865,180 B1
(45) Date of Patent: Mar. 8, 2005

(54) METHOD FOR BUNDLING CONNECTIONS

(75) Inventor: Stephan Waespe, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 09/590,326

(22) Filed: Jun. 8, 2000

(30) Foreign Application Priority Data

Aug. 12, 1999 (CA) .............................................. 2280278

(51) Int. Cl.⁷ .............................................. H04L 12/50
(52) U.S. Cl. .................... 370/360; 370/395.2; 709/223; 379/219
(58) Field of Search ................................. 370/392, 410, 370/256, 395.1, 352, 395.3, 360, 268, 395.2, 397; 709/223; 379/230, 219

(56) References Cited

U.S. PATENT DOCUMENTS

| | | | | |
|---|---|---|---|---|
| 5,519,690 A | * | 5/1996 | Suzuka et al. | 370/395.3 |
| 5,940,393 A | * | 8/1999 | Duree et al. | 370/392 |
| 6,041,117 A | * | 3/2000 | Androski et al. | 379/268 |
| 6,097,723 A | * | 8/2000 | Fielding et al. | 370/395.2 |
| 6,181,696 B1 | * | 1/2001 | Fielding et al. | 370/360 |
| 6,301,252 B1 | * | 10/2001 | Rangachar | 370/395.2 |
| 6,560,226 B1 | * | 5/2003 | Torrey et al. | 370/360 |

* cited by examiner

*Primary Examiner*—John Pezzlo
(74) *Attorney, Agent, or Firm*—Sawyer Law Group LLP

(57) ABSTRACT

A method for bundling connections within a switch controller of a broadband switching network. Connections are bundled into logical units of related connections. This method also allows a common code base for switch controllers putting hardware specific code into a portion of the bundling code.

10 Claims, 18 Drawing Sheets

METHOD FOR BUNDLING CONNECTIONS

FIELD OF THE INVENTION

This invention relates to a network switching system for controlling connections through a network having analogue and digital switches. More particularly, the present invention relates to a method for bundling individual connections into logical groups within an apparatus for controlling network switching. Once the connections have been bundled in this way, the switch network can be controlled uniformly and efficiently without regard for the hardware type or manufacturer of the switch.

BACKGROUND OF THE INVENTION

Various types of networks involving switches are in common use such as public and private telephone networks, local area networks (LAN) and wide area networks (WAN). LAN and WAN networks are largely digital and generally use asynchronous transfer mode (ATM) signals, whereas telephone networks typically use analogue or synchronous digital signals (SONET).

Broadband telecommunications networks involve networks containing hardware switches of various types, and for a given type, of different manufacturers. Such a network could contain frame relay, ATM and/or baseband analogue switches. For example, the switches in one city could be primarily analogue switches while those in another city could contain ATM switches or a mixture of ATM and analogue switches.

In general, switches of one manufacturer are controlled using different protocols from those of other manufacturers. In order to set up a call that would use various switches, a switch controller would have to be created for each instance of switch hardware encountered. In addition, each controller node would have to know the protocol of each switch at every location. Consequently, if a given switch were changed to a different hardware type or manufacturer, a new switch controller for controlling that switch would have to be created and the interaction between the switch controller and the controller node would have to be modified. Obviously, such a system is complex and inefficient.

As a result of these difficulties, there is a need for an adaptive, modifiable, extensible and reusable solution to controlling and implementing a network switching system through the switch controllers.

Addressing the need for a switch controller framework that can extend to different switch types and different manufacturers is not a trivial task. Typically, each switch type has a specific control protocol and message passing protocol and these protocols may vary with manufacturers within the same switch type. For example, an analogue switch is typically controlled on a connection-by-connection basis where a single command performs a single connection. On the other hand, for an ATM switch, several connections may be grouped into a single logical unit and a single command may be all that is necessary to make a broadcast connection such that one port is connected to many other ports.

It is, therefore, an object of this invention to provide a method for grouping related connections into logical units.

It is a further object of this invention to provide a switch controller mechanism such that different kinds of switches can be supported and different switch controllers can be derived from a single code base.

SUMMARY OF THE INVENTION

According to the invention there is provided a method of bundling connections within an apparatus for controlling network switching across digital and analogue hardware switches which includes a central network controller node having a call task for booking and executing calls. A call is a request by a first terminal to be connected with a second terminal. The call task executes a call by issuing commands to set up the plurality of hardware switches along the path from the first terminal to the second terminal to interconnect the two. Several calls may be simultaneously routed through different ports in a single hardware switch. A switch master task receives commands to control all of the switches in the network, maintains status information for all of the switches, and distributes requests to specific switch controller tasks to make or break particular connections.

A switch controller task within a switch controller is coupled to the central network controller node and is operative to interface between the central network controller node and an associated hardware switch. The switch controller task receives requests for particular connections to be made within the switch. The switch controller task issues commands to the switch to make the requested connections. To implement a generic switch interface and a method of efficiently dealing with different switch hardware, the switch controller uses a connection bundler. The connection bundler groups related generic switch commands together into bundles that correspond to the granularity at which switch operations are most efficiently carried out by the switch being controlled. The switch controller further operates to convert the generic control commands for a generic switch interface in each of the bundles into commands that are specific to control a particular type of hardware switch.

For example, when a call is made from a client in location A to a client in location B, the components of the call are decomposed into a list of simplex connection requests (e.g. connect port 3 to port 2) between input and output ports on a generic switch interface. For each simplex connection request received, each of the existing bundles of the switch controller is asked if it would like to claim the connection request. If a bundle wishes to claim the connection request then the connection is placed in the bundle. If no bundles exist or if no bundle wishes to claim the connection, then a new bundle is created and the connection is placed within it. Connections are placed in bundles if they are related to the other connections in the bundle. For example, in an ATM switch, a duplex connection may consist of the simplex connection requests, connect port 3 to port 2 and connect port 2 to port 3. In general, an ATM switch can perform a duplex connection in a single operation. Therefore, if a bundle contains the simplex connection, connect port 3 to port 2 and the same bundle is offered the simplex connection connect port 2 to port 3, the bundle will claim the connection because the two simplex connections are related in that the pair form a duplex connection.

A typical network may include both analogue and digital switches. Moreover, the switches usually have different protocols and configurations.

Preferably, the network may be a broadband telecommunications network.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE INVENTION

Throughout the figures, like elements are indicated by like reference numbers.

Figure 1:
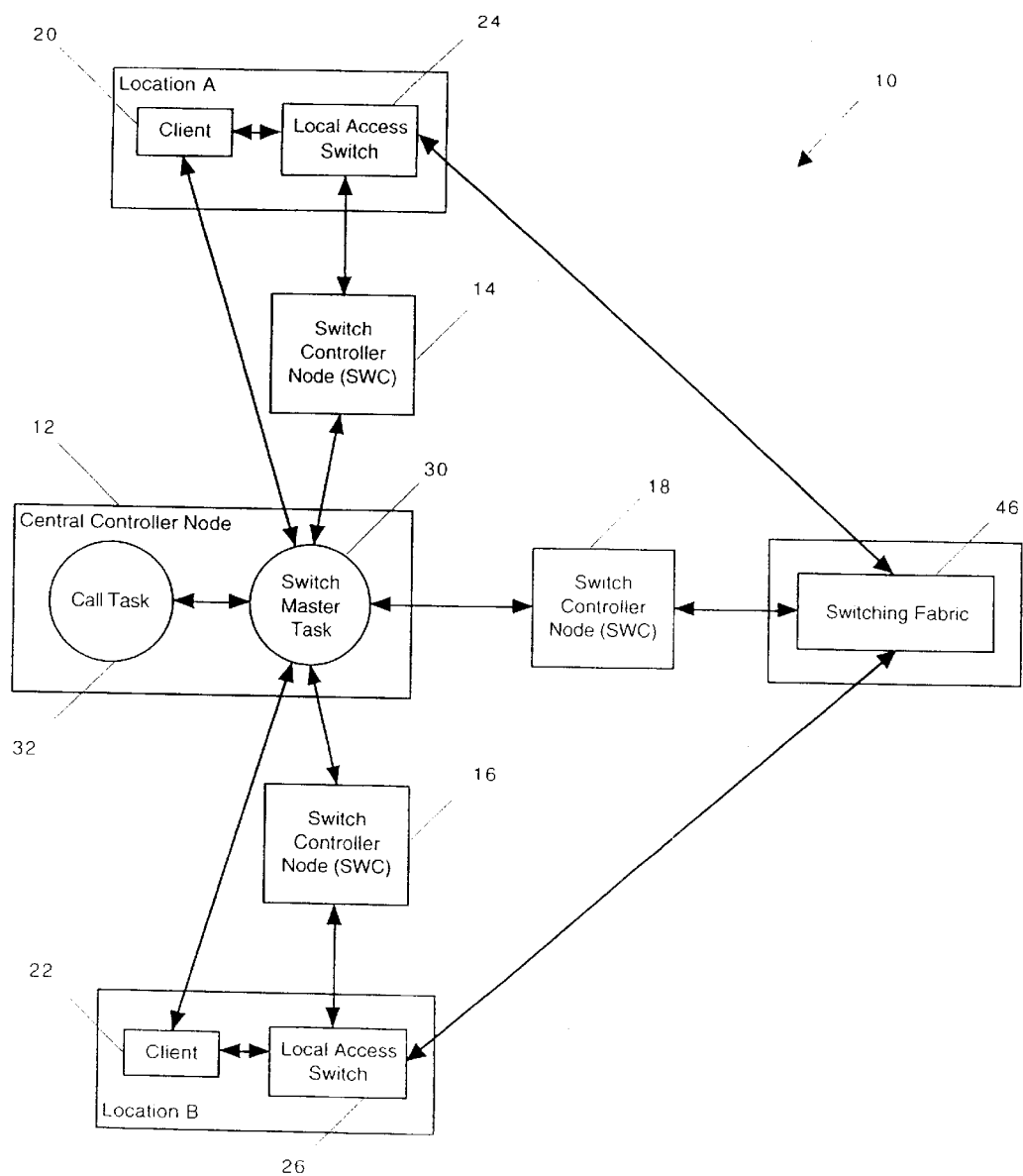
FIG. 1 is a schematic block diagram of a broadband switching network.

Referring to FIG. 1, a typical broadband switching network 10 has a number of local access switches 24 and 26 in various locations. For example, clients 20 and 22 are connected to local access switches 24 and 26, respectively. One or more backbone switches or switching fabrics 46 allow a path to be created through them which connects local access switches 24 and 26.

Should a client 20 in Location A wish to call a client 22 in Location B, it is necessary to set up a path through all of the switches so that the client 20 can access client 22 in Location B. Since different switches are controlled in numerous ways through a variety of protocols and configurations, it would be necessary for the Central Controller Node (CNC) 12 which controls the local access switch 24 through Switch Controller Node (SWC) 14 in Location A to know the protocol and configuration of each switch in the path to client 22. Further, it would be necessary for each switch controller in the path to be specific to the type and manufacturer of the switch it controls.

Figure 2:
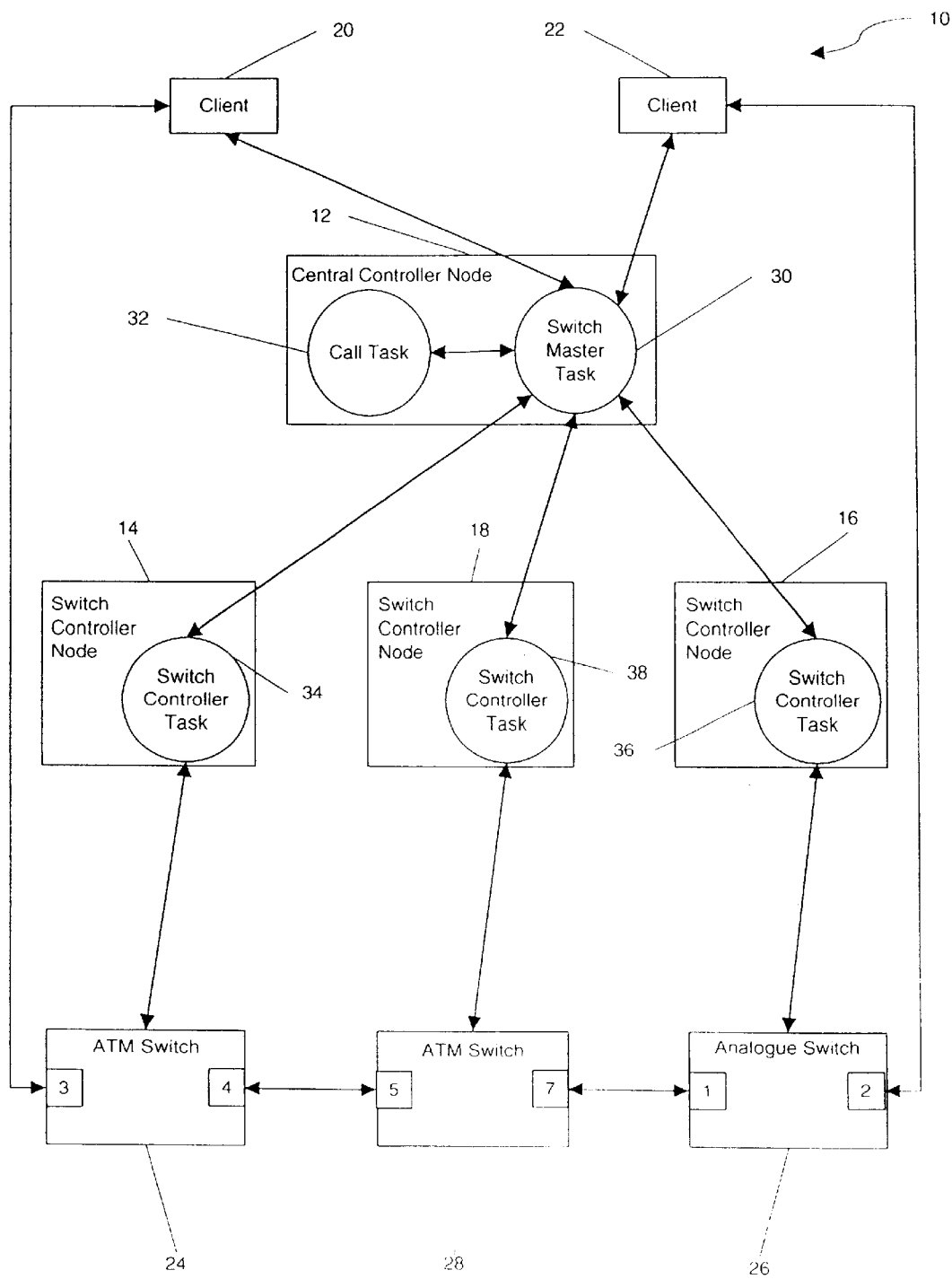
FIG. 2 is a schematic block diagram showing details of a portion of a broadband switching network.

Referring to FIG. 2, there is shown an architecture that allows the characteristics of each switch in a system to be insulated from the rest of the broadband switching network 10. In this case, the CNC 12 defines a group of cooperative tasks whose purpose is to control the network 10. The CNC 12 contains a set of software, a call task 32, which is responsible for both scheduling calls and determining if the resources are available for a particular call to take place at a particular time. The call task 32 is also responsible for executing calls, for advising the terminals at either end that they are involved in a call and for setting up the hardware switches 24, 26 and 28 that are under its control.

The switch master task 30 is another set of software within the CNC 12, which provides a single point of access for clients to the broadband switching network 10. The switch master task 30 receives commands to control all of the switches 24, 26 and 28, in the network 10 and maintains status information for all of them. The switch master task 30 distributes requests and performs retries on all failed connections. The switch master task 30 is also responsible for maintaining the current state of all of the network switches, so that these can be restored to their proper state in the case of a loss of communications or switch failure.

The switch controller nodes (SWC) 14, 16 and 18 are responsible for the task of controlling the associated hardware switches 24, 26 and 28, respectively. The SWCs 14, 16 and 18 each contain a set of software, switch controller tasks 34, 36 and 38, respectively, whose primary mission is to bundle generic switch control commands which it receives, into related connections, and convert the generic switch control commands within each bundle into commands that control a particular kind of switch hardware. The switch controller tasks 34, 36 and 38 are also responsible for doing surveillance over the hardware switches 24, 26 and 28, and reporting failures to the switch master task 30 using generic switch status reports.

In order to complete a call between client 20 and client 22 (see FIG. 2), switch controller task 34 causes switch 24 to connect ports 3 and 4. Switch controller task 38 causes switch 28 to connect ports 5 and 7, and switch controller task 36 causes switch 26 to connect ports 1 and 2 thereby completing the call.

In order for the call from client 20 to client 22 to be successful, the switch master task 30 must distribute the generic switch control commands to the correct locations so as to make the desired switching operations take place. The switch master task 30 will receive a request from client 20 to call client 22. The call task 32 will determine which switches must be connected and passes lists of connections to be made by each switch to the switch master task 30. In this case, the connections list for switch 24 will contain the command connect port 3 and port 4, the connections list for switch 28 will contain the command connect port 5 to port 7 and the connections list for switch 26 will contain the command connect port 1 to port 2. The switch master task 30 passes each of the appropriate connections lists to the appropriate switch controller tasks 34, 36 and 38. The switch controller tasks 34, 36 and 38 use a bundler (see FIGS. 4 and 5), which places each of the connections from the connections list into bundles of related connections. The switch controller tasks 34, 36 and 38 then signals the bundler to ask each of the bundles to connect itself.

In this simple example, each connections list contains only one connection, but in reality a connections list may contain 1 to n connections, where n is equal to the number of ports on a switch.

It is important to note that the bundlers of switch controller tasks 34, 36 and 38 must translate the generic switch connection commands in the connections list received from the central network controller node 34, into the proper commands that cause the hardware to make the requested connections. The commands to hardware switch 24 may be entirely different from those to hardware switch 26. In order to insulate the central network controller 12 from the various different switch protocols, the associated switch controllers 14, 16 and 18, present to the switch master task 30 a generic switch interface which is the same for all switch controllers regardless of the specific hardware supported by the latter. In this way, the switch master task 30 does not even have to be aware of the existence of different types or manufacturers of switches in its network, or the way in which they are controlled.

The principle of insulation extends to the switch controller tasks 34, 36 and 38. As described earlier, different kinds of switches, and switches from different manufacturers, are controlled utilizing different protocols. Typically, an analogue switch is controlled on a connection-by-connection basis whereas for an ATM switch, several connections may be grouped into a single logical unit to be performed by a single operation. Inefficiencies result when the different switch types are treated in the same manner.

To overcome these inefficiencies, the switch controller tasks 34, 36 and 38 utilize a bundler. The bundler places connections received in the connections list from switch master task 30 into bundles and connects the bundles. Connections are placed in bundles if they are related to other connections in the bundle. For example, in an ATM switch, a duplex connection may consist of the simplex connections, connect port 3 to port 2 and connect port 2 to port 3. In general, an ATM switch can perform a duplex connection in a single operation. Therefore, if a bundle contains the simplex connection, connect port 3 to port 2 and the same bundle is offered the simplex connection, connect port 2 and port 3, the bundle will claim the connection because the two simplex connections are related in that the pair form a duplex connection.

Figure 3:
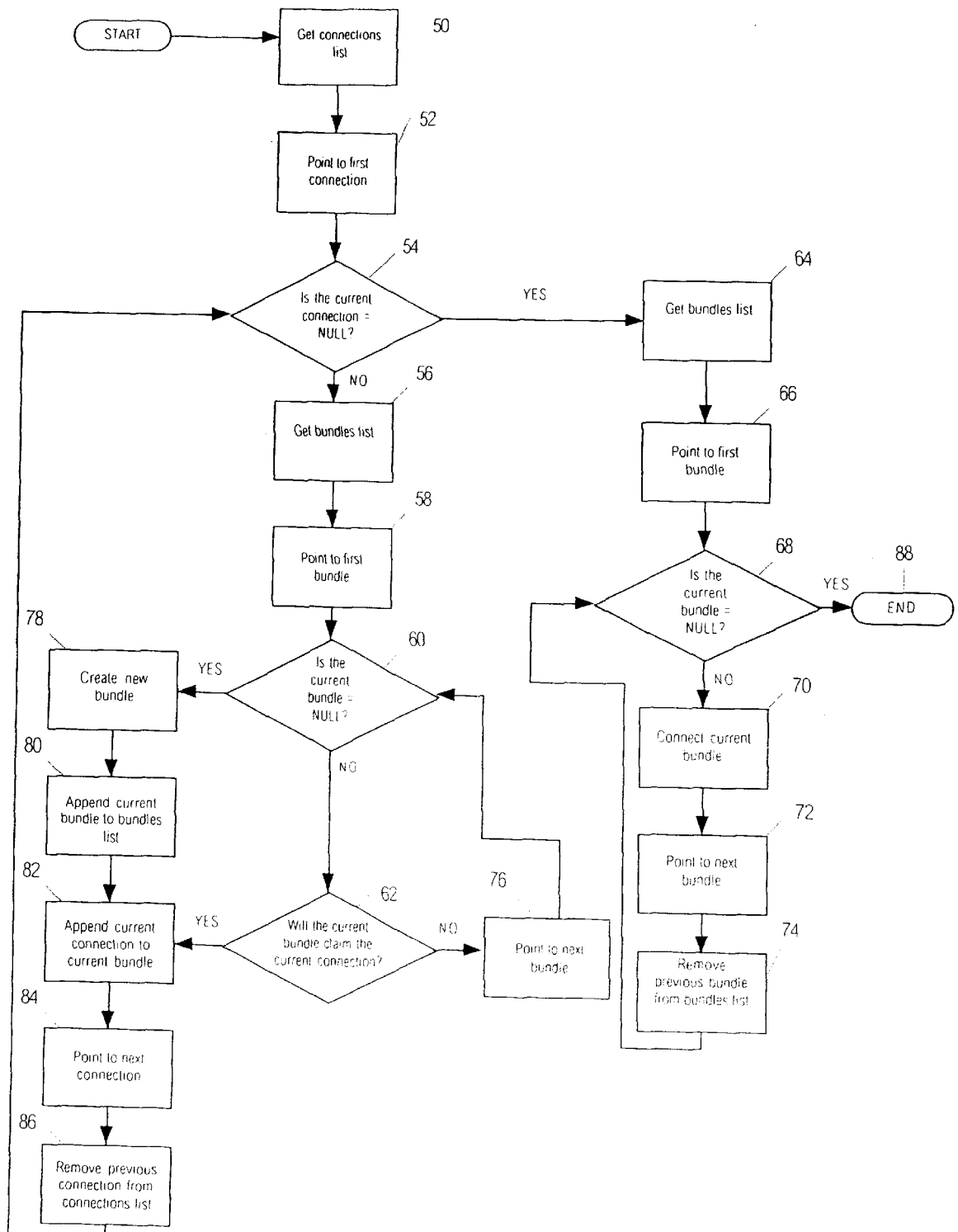
FIG. 3 is a decision tree that outlines the steps in software to bundle connections into related logical units.

Referring to FIG. 3, the decision tree setting forth the algorithm used to bundle connections is given. At step 50 the list of connections is received by the generic switch and at step 52 a pointer points to the first element in the list of connections. At step 54, the element pointed to is tested to determine if it is NULL. If there are no connections in the list then the pointer will point to the end of the list (a NULL value). If there is at least one connection in the list then the pointer will point to that connection.

Next, at step 56, the list of bundles within the generic switch is retrieved. A pointer is set to point to the first bundle in the list (step 58). At step 60, the list of bundles is tested to determine if the pointer points to a bundle or to the end of the bundle list (NULL). If the pointer is pointing to a bundle then a step 62, that bundle is asked if it will claim the current connection that is pointed to in the list of connections. If the bundle will not claim the current connection, then at step 76, the bundle pointer is moved to point to the next bundle in the list and this element is tested to determine if the pointer is pointing to a bundle or to the end of the bundle list (NULL).

If the pointer is pointing to the end of the bundle list (NULL) either because the list of bundles is empty or none of the bundles in the list would claim the current connection then, at step 78, a new bundle is created. At step 80, this new bundle is appended to the list of bundles and the current connection is placed in the new bundle (step 82). At step 84, the pointer is moved to the next element in the connections list and the previous connection is removed from the connections list. The system then goes back to step 54, if there are no connections in the list then the pointer will point to the end of the list (a NULL value) or, if there is at least one connection in the list, then the pointer will point to that connection.

At step 54, if there are no connections (pointer points to NULL) in the list then the bundles list is retrieved (step 64) and a pointer is set to point at the first element in the bundle list (step 66). At step 68, if there are no bundles in the bundle list (pointer points to NULL) then the algorithm ends. If the pointer points to a bundle then the connections within that bundle are connected (step 70). Once all the connections in the bundle have been connected then the pointer is moved to point to the next bundle in the bundles list (step 72). At step 74, the previous bundle is removed from the bundles list and the pointer is tested to see if it points to a bundle or to the end of the bundles list (step 68).

For analogue switches, which operate on a connection-by-connection basis, and some digital switches, multiple bundles are not necessary. For example, in an analogue switch, all of the simplex connections will be placed into a single bundle. This bundle will claim all connections that are offered to it. When the bundle is connected, each of the simplex connections within the bundle will be connected in turn on the connection-by-connection basis. The connection-by-connection operation of the analogue switch precludes the need for different bundles as each simplex connection must be made individually.

Referring to FIGS. 4*a*–*e*, an example of bundling employing the algorithm discussed above utilizing analogue switch 26 is depicted. The connections list 90 is created by the call task 32, forwarded to the switch master task 30, which conveys the connections list 90 to the SWC 16 where it is utilized by the switch controller task 36. For illustrative purposes only, the connections list 90 of this example contains connections commands Connect Port 1 to Port 5, Connect Port 3 to Port 2 and Connect Port 2 to Port 3. The switch controller task 36 has a software component called a bundler 92, which is responsible for bundling and connecting the connection commands listed in the connections list 90. However, as described earlier, as switch 26 is an analogue switch and operates on a connection-by-connection basis, multiple bundles are not needed and a single bundle will claim all the connections.

Figure 4A:
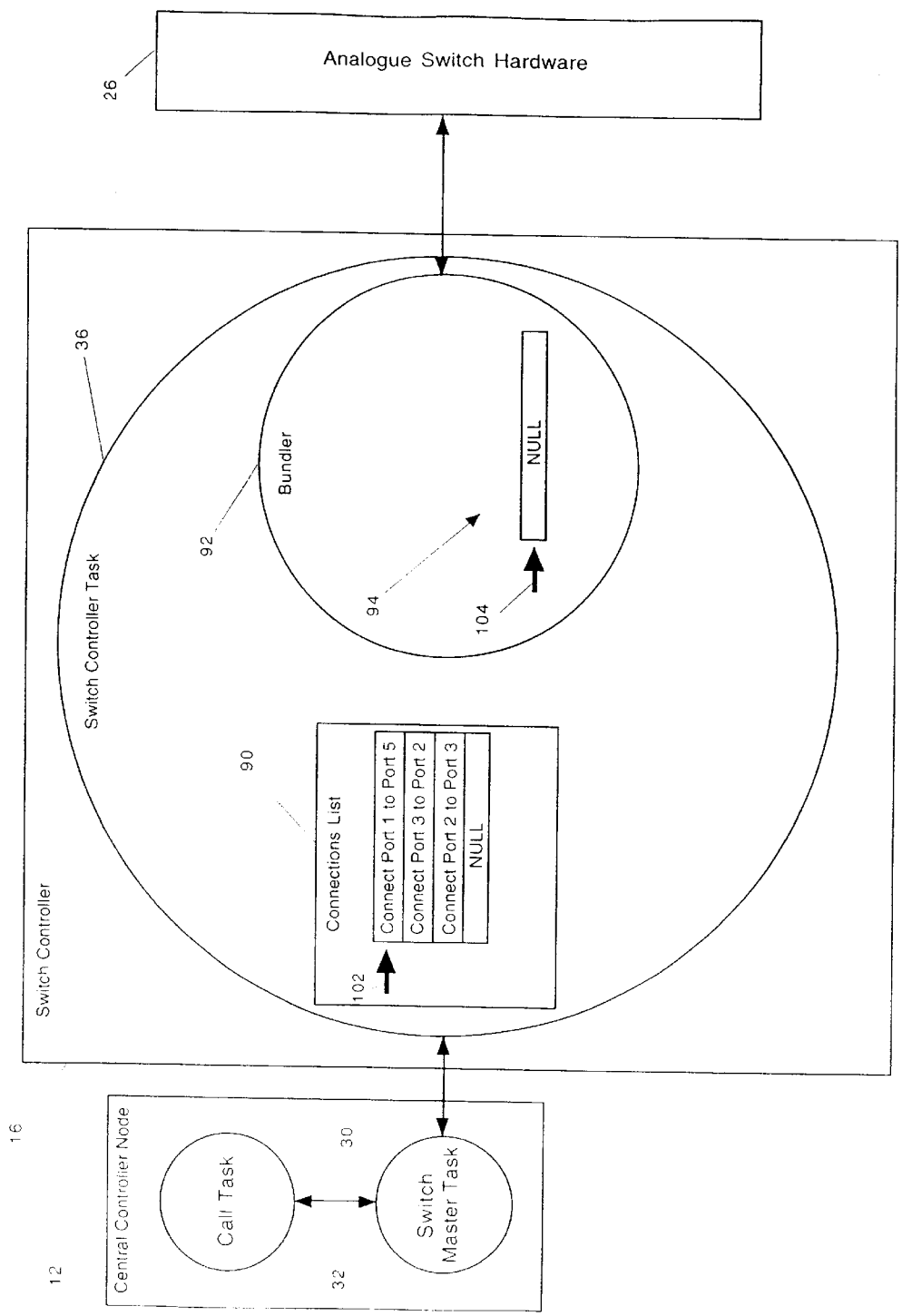
FIGS. 4a–e are abstract block diagrams demonstrating bundling on an isolated system of a Central Controller Node, a Switch Controller and Analogue Switch Hardware for clarity.
Figure 4B:
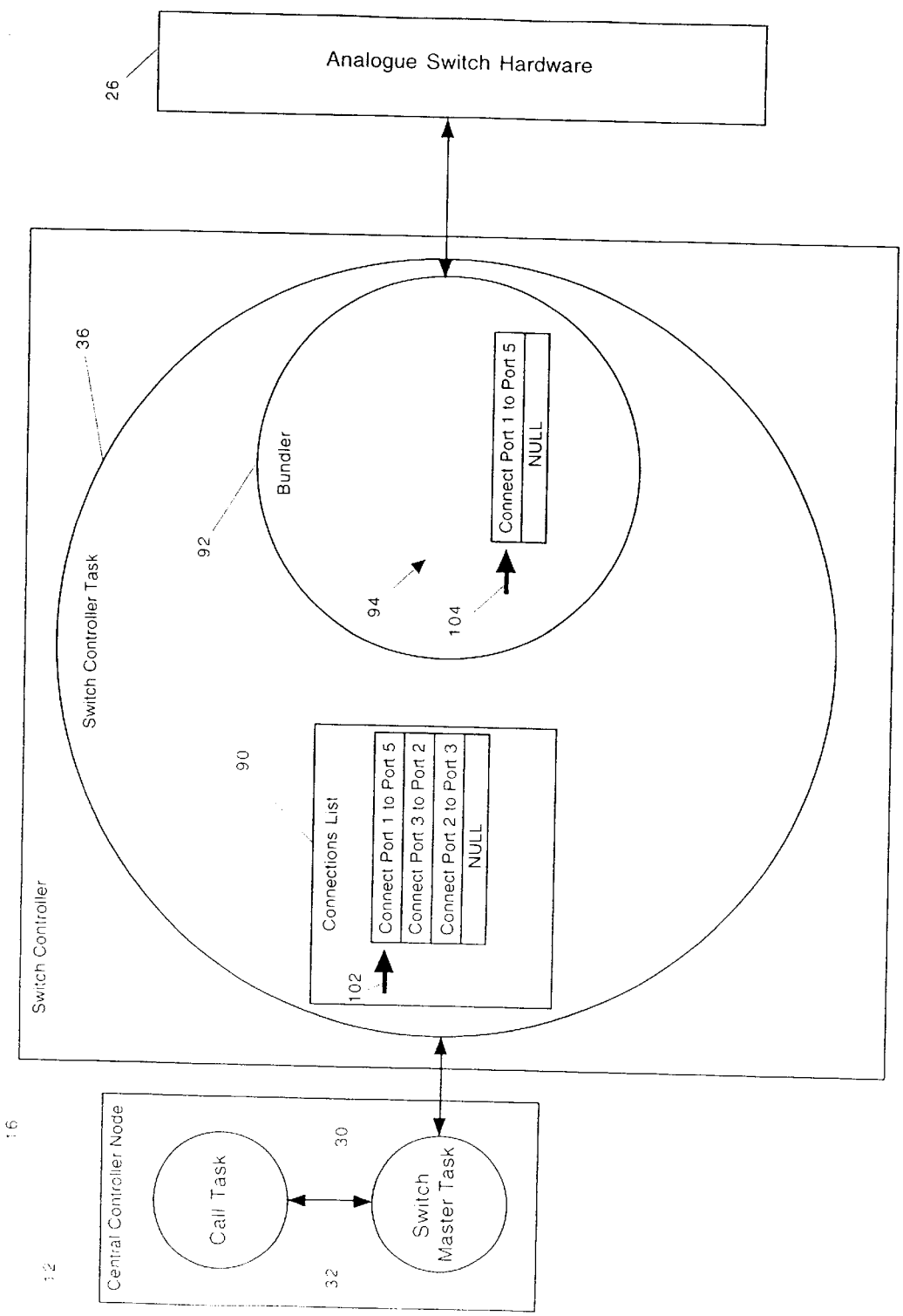
Figure 4C:
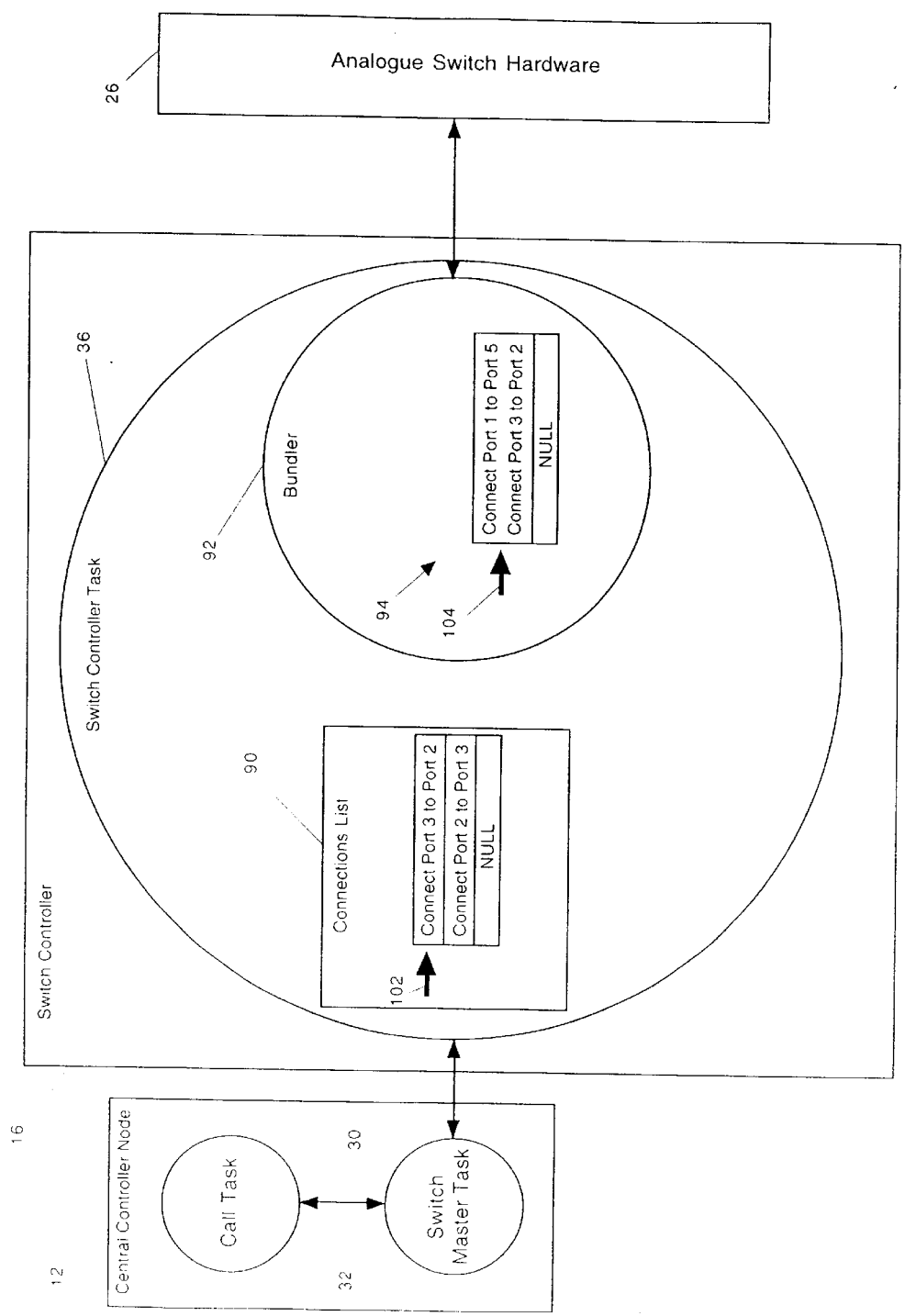
Figure 4D:
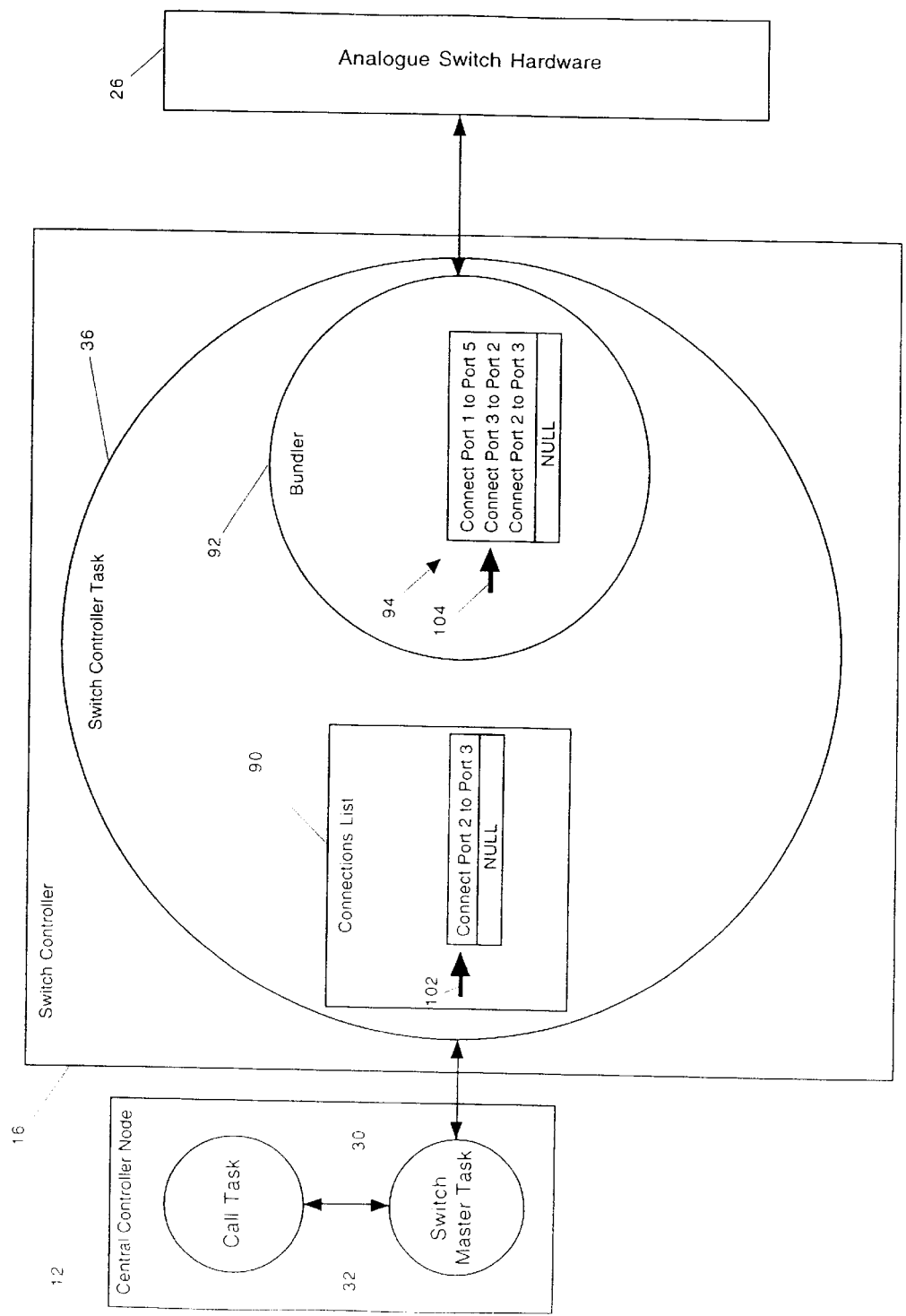
Figure 4E:
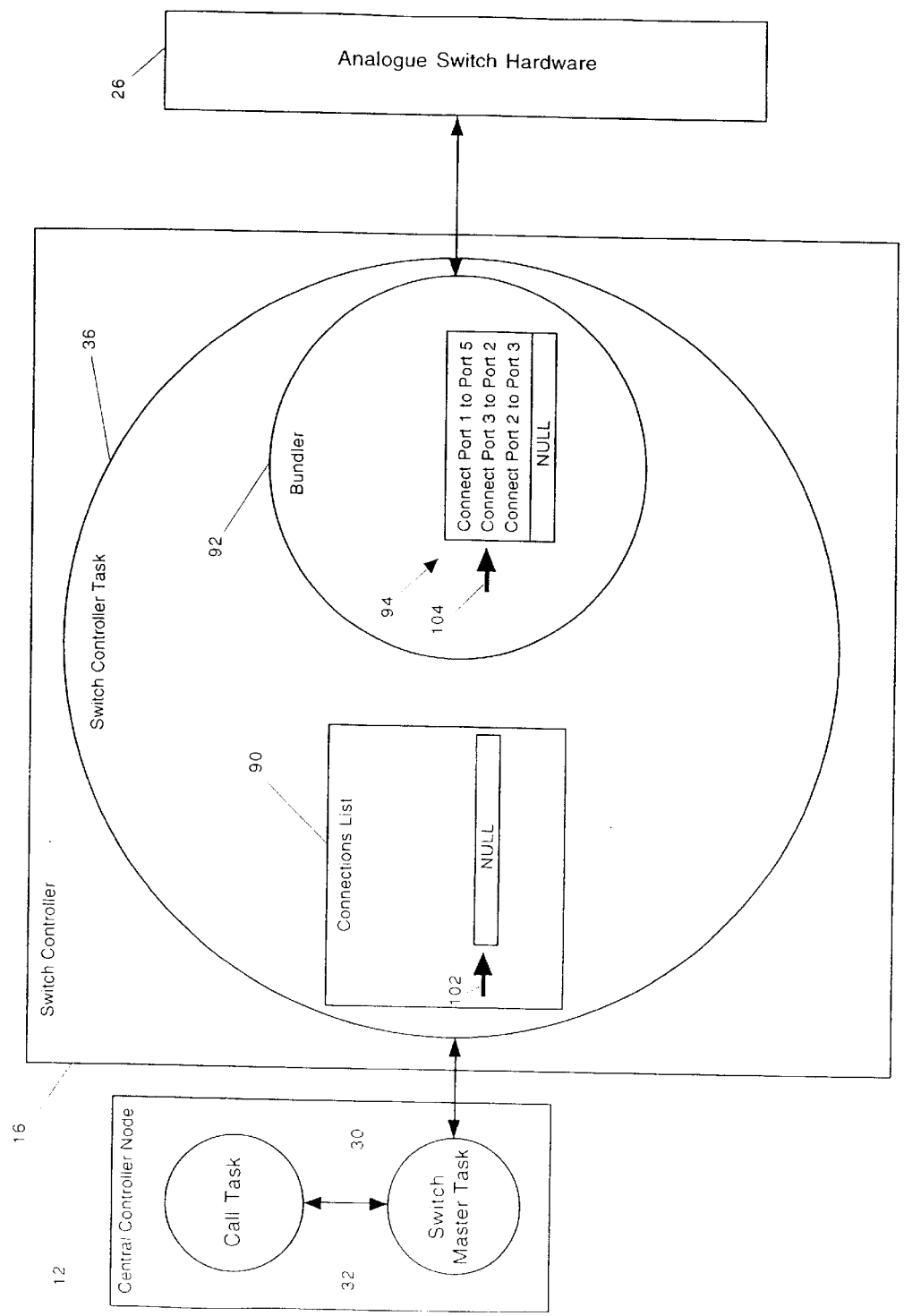

Referring to FIG. 4*a*, the connections pointer 102 points to the first element in the connections list 90 and the bundles list 94 has no bundles therefore the bundles pointer 104 points to the end of the list (NULL). Referring to FIG. 4*b*, a new bundle is created in the bundles list 94 which is pointed to by bundles pointer 104. The connection pointed to by connections pointer 102 (Connect Port 1 to Port 5) is placed in the bundle. Referring to FIG. 4*c*, the connections pointer 102 has been moved to the next element in the connections list 90 and the previous element has been removed. Switch 26 is an analogue switch, therefore, the connection pointed to (Connect Port 3 to Port 2) is placed in the first bundle of the bundles list 94. Referring to FIG. 4*d*, once again, the connections pointer 102 is moved to the next element in the connections list 90 and the previous element is removed from the connections list 90. In a similar manner to the previous connection, the connection pointed to by the connections pointer 102 is placed in the bundle in bundles list 94, pointed to by bundles pointer 104. Referring to FIG. 4*e*, the connections pointer 102 is moved to the next element in the connections list 90 and the previous element is removed. This element is NULL signifying that the connections list 90 is now empty, therefore the bundler 92 is signaled to begin connecting the bundles of bundles list 94.

Referring now to FIGS. 5*a*–*e*, for comparison, an example of bundling employing the algorithm discussed above utilizing ATM switch 24 is depicted. The communication between the switch master task 30 and the switch controllers 14 and 16 are identical. Therefore, the connections list 96 is created by the call task 32, forwarded to the switch master task 30, which conveys the connections list 96 to the SWC 14 where it is utilized by the switch controller task 34. For comparison purposes, the connections list 96 of this example contains the same connection commands as connections list 90, namely connection commands Connect Port 1 to Port 5, Connect port 3 to Port 2 and Connect Port 2 to Port 3. The switch controller task 34 also has a bundler 98, which is responsible for bundling and connecting the connection commands listed in the connections list 96. Switch 24 is an ATM switch therefore each of the connections in the connections list 96 will be offered to the bundles in the bundles list 100 thereby grouping connections into logical units.

Figure 5A:
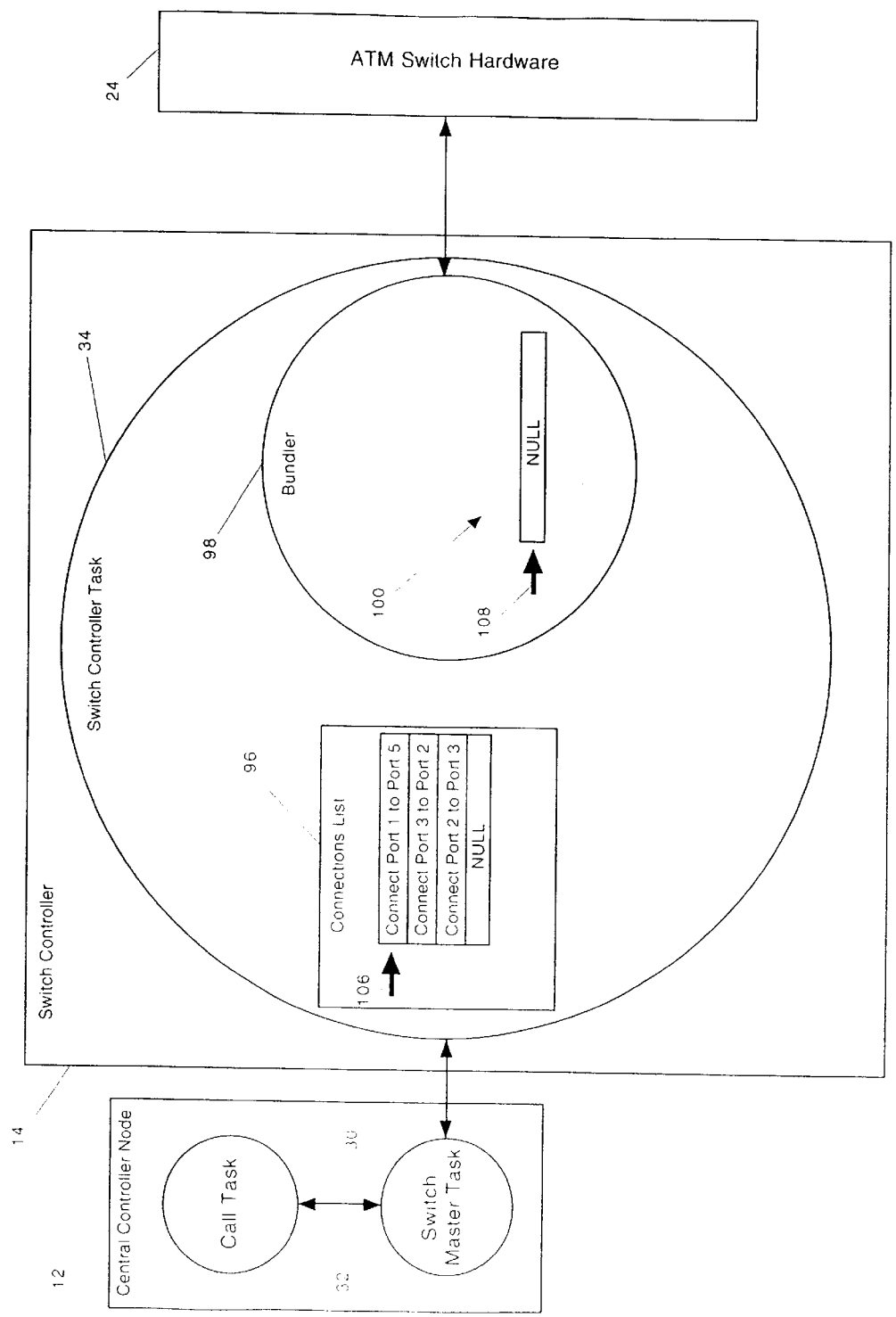
FIGS. 5a–e are abstract block diagrams demonstrating bundling on an isolated system of a Central Controller Node, a Switch Controller and ATM Switch Hardware for clarity.
Figure 5B:
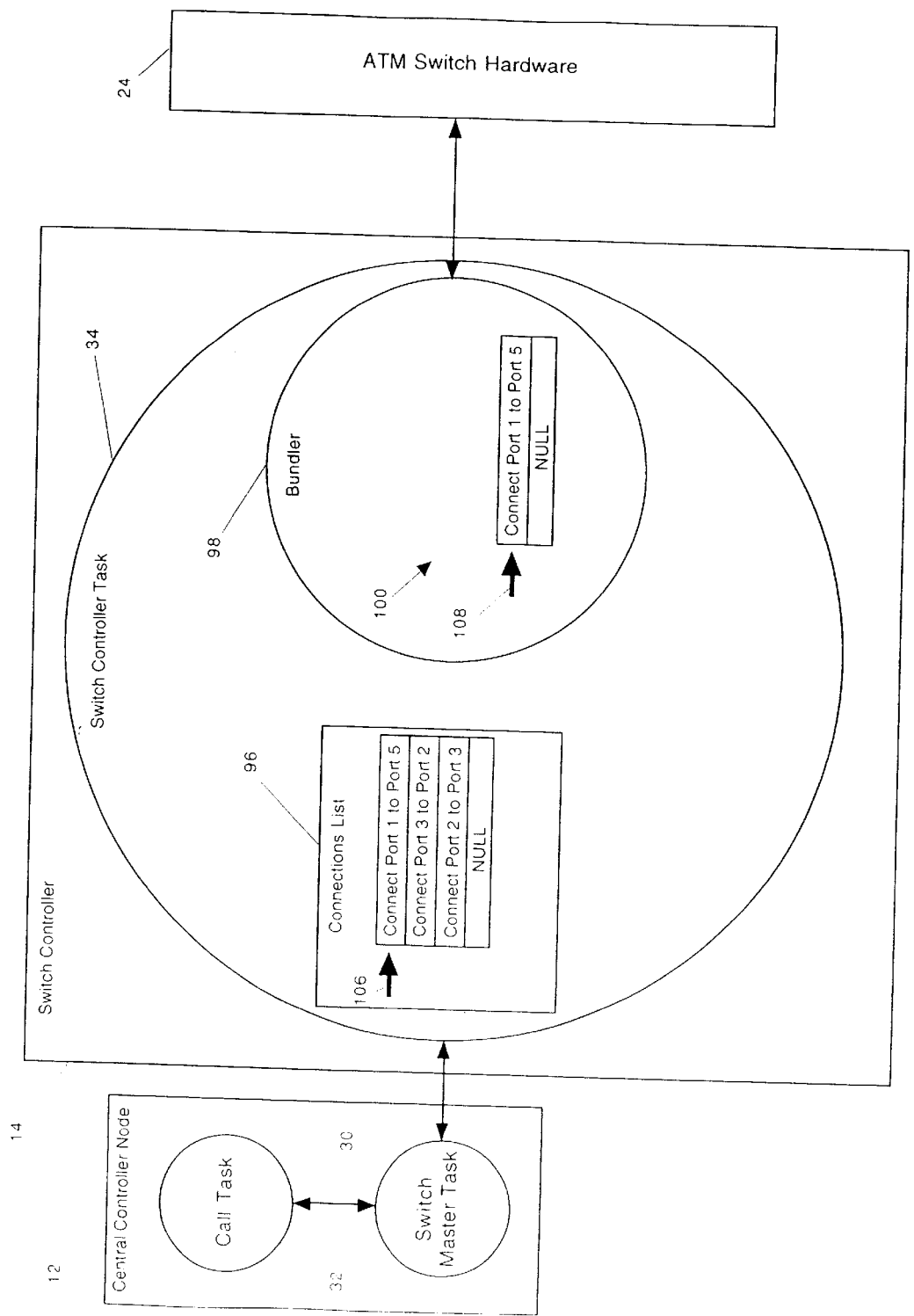
Figure 5C:
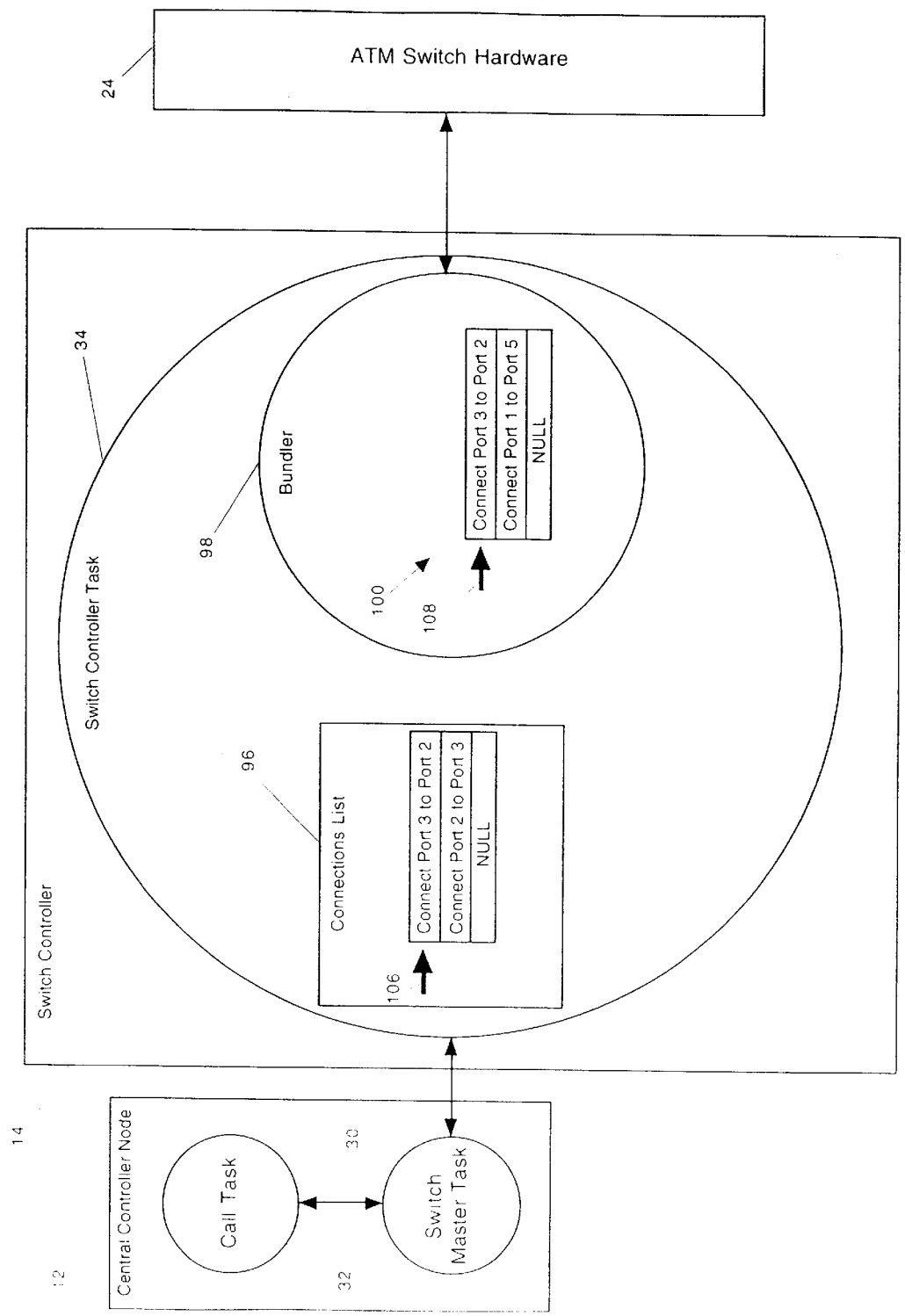
Figure 5D:
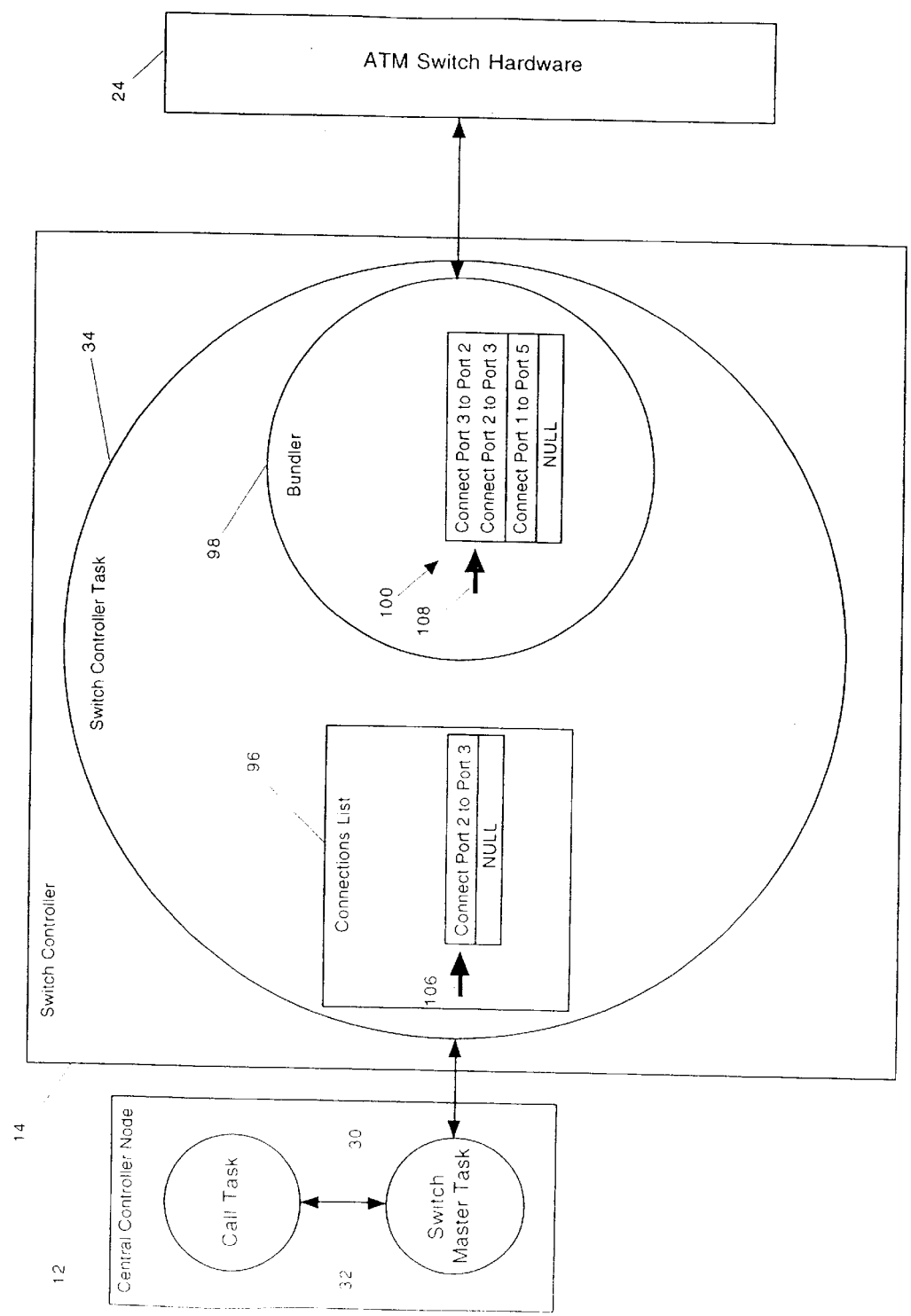
Figure 5E:
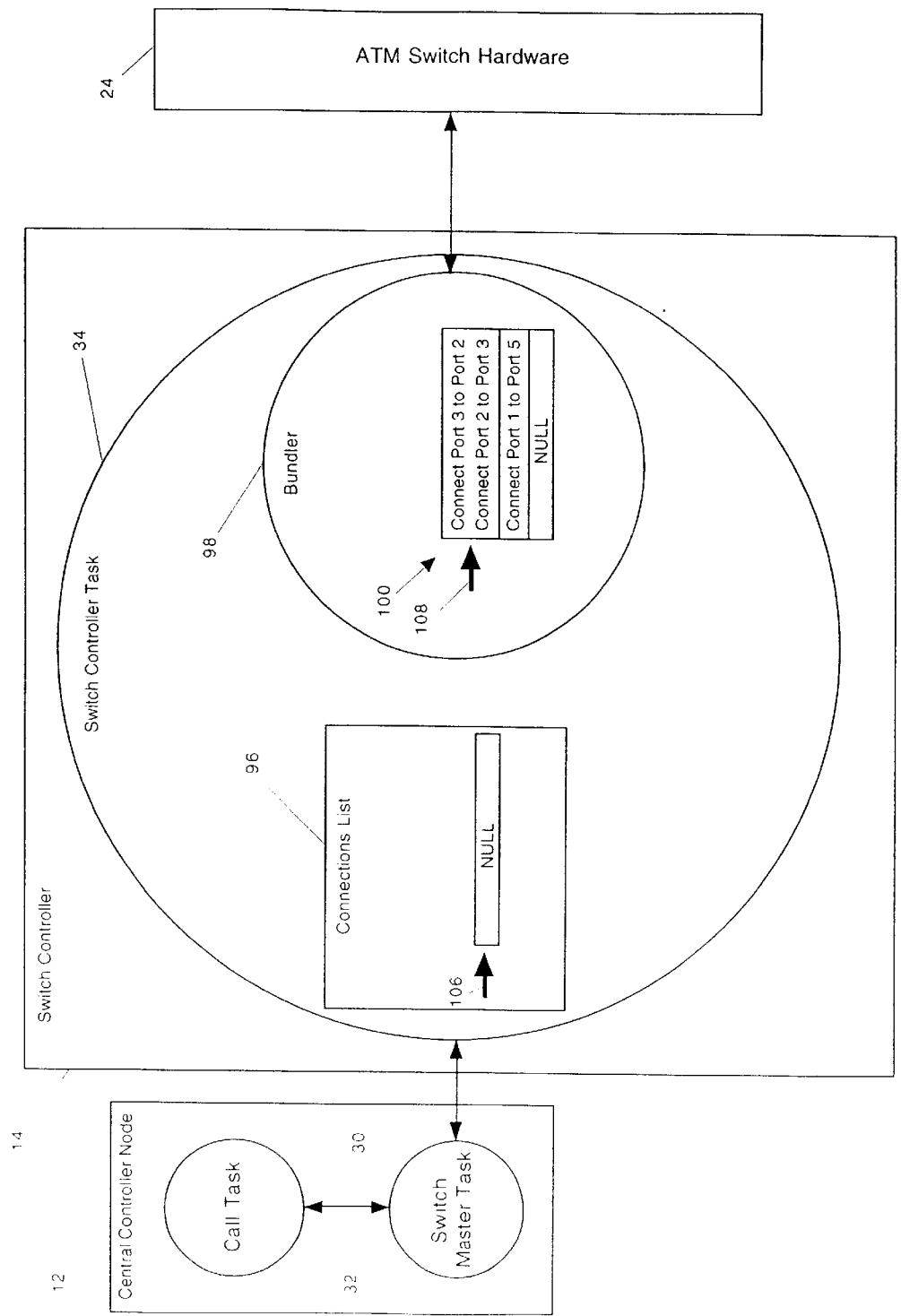

Referring to FIG. 5a, the connections pointer 106 points to the first element in the connections list 96 and bundles pointer 108 points to the first element in the bundles list 94 which, as a result of having no bundles, points to the end of the list (NULL). Referring to FIG. 5b, a new bundle is created in the bundles list 100 which is pointed to by bundles pointer 108. The connection pointed to by connections pointer 106 (Connect Port 1 to Port 5) is placed in the bundle. Referring to FIG. 5c, the connections pointer 106 has been moved to the next element in the connections list 96 and the previous element has been removed. Switch 24 is an ATM switch, therefore, the connection pointed to (Connect Port 3 to Port 2) is offered to the first bundle. The combination of the two connections (Connect Port 1 to Port 5 and Connect Port 3 to Port 2) are not related therefore a new bundle is created and the connection pointed to by connections pointer 106 in the connections list 96 is placed into the newly created bundle of the bundles list 100 pointed to by bundles pointer 108. Referring to FIG. 4e, once again, the connections pointer 106 is moved to the next element in the connections list 96 and the previous element is removed from the connections list 96. In a similar manner to the previous connection, the connection pointed to by the connections pointer 102 is offered to the bundles in bundles list 94. In this case, the combination of connections Connect Port 3 to Port 2 and Connect Port 2 to Port 3 creates a logical unit therefore the bundle pointed to by the bundles pointer 108 claims the connection and the connection is placed in the bundle. Referring to FIG. 5e, the connections pointer is moved to the next element in the connections list 96 and the previous element is removed. This element now pointed to is NULL signifying that the connections list 96 is now empty, therefore the bundler 98 is signaled to begin connecting the bundles of bundles list 100.

Figure 6A:
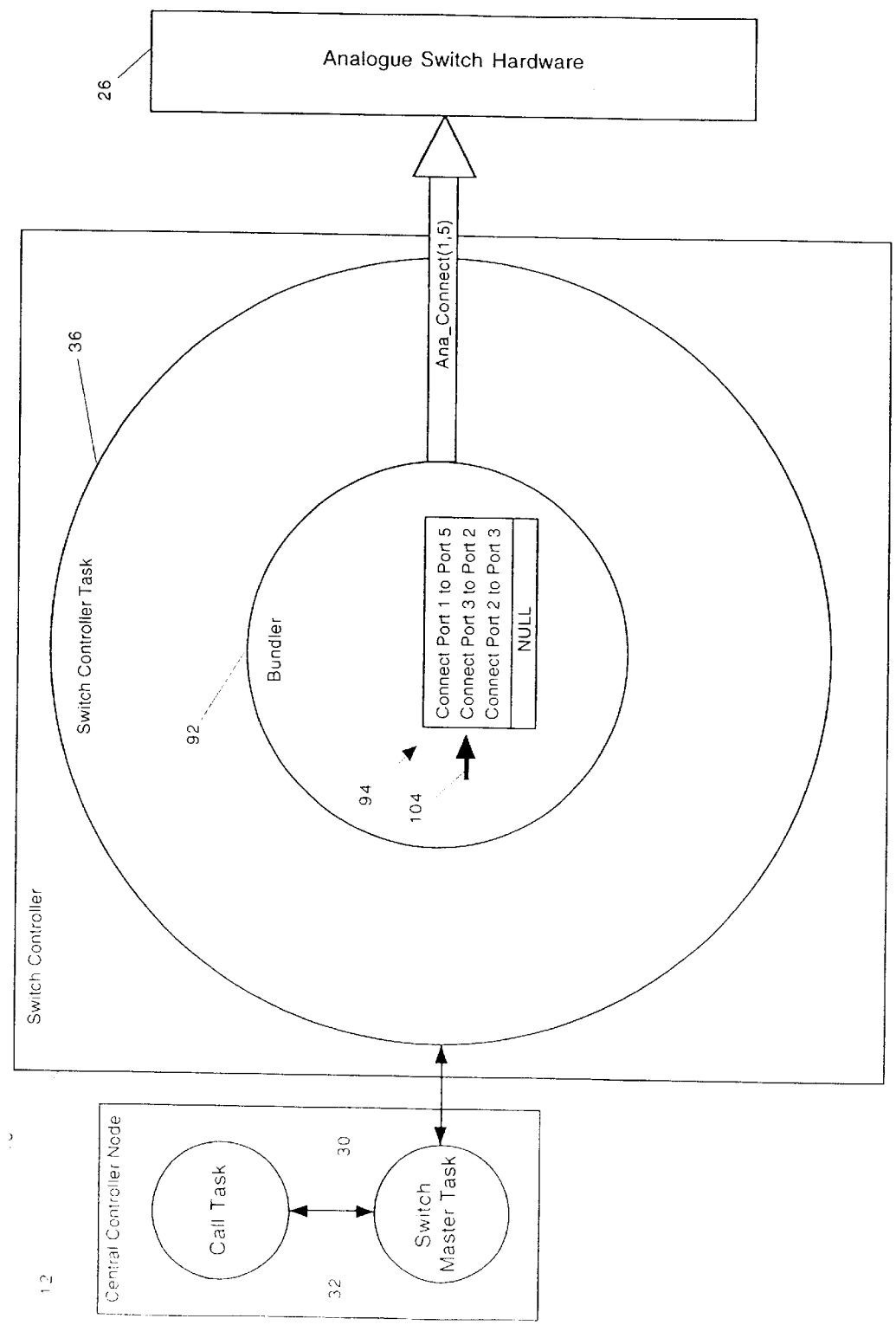
FIG. 6a–c are abstract block diagram representations of bundle connection communications between the Central Controller Node, Switch Controller and Analogue Switch Hardware.
Figure 6B:
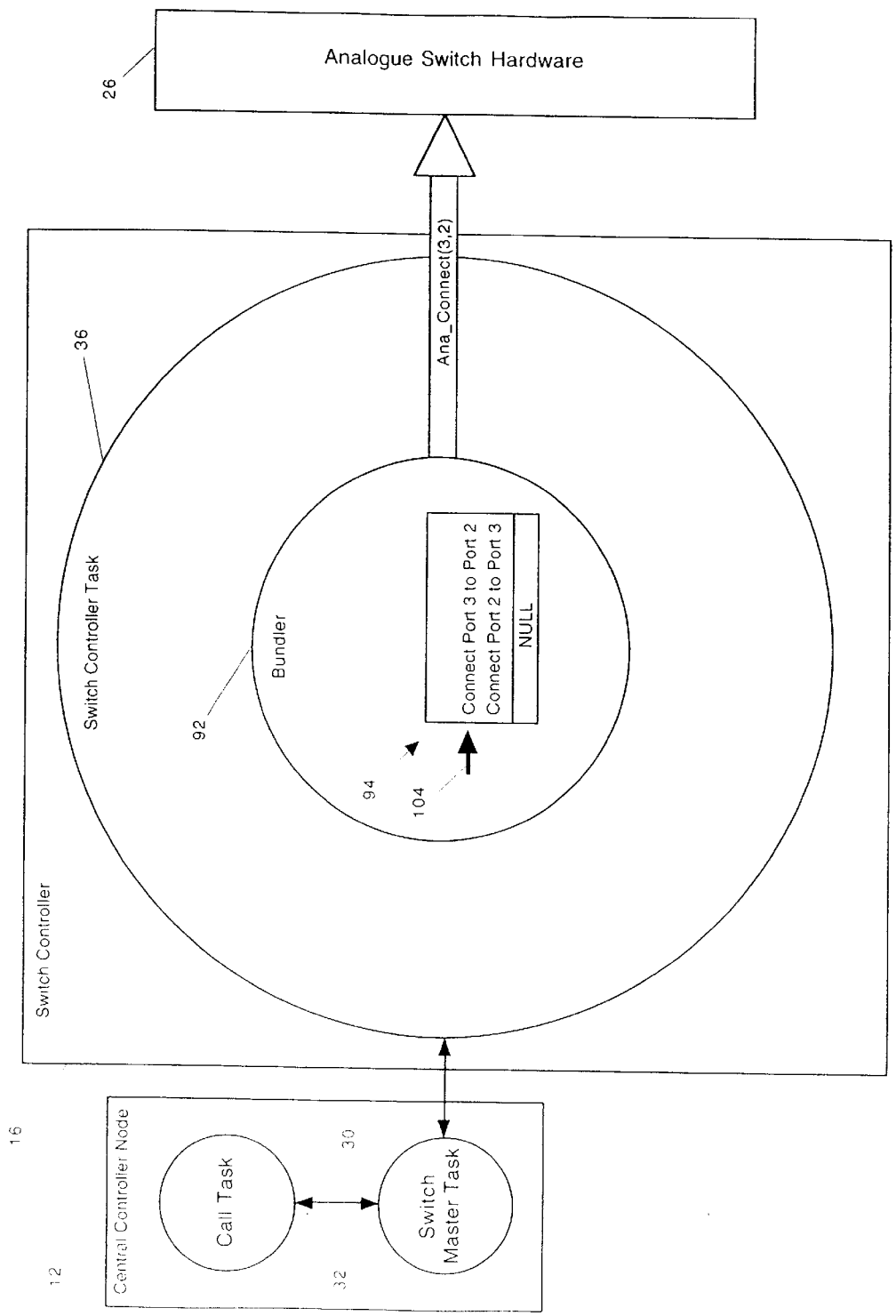
Figure 6C:
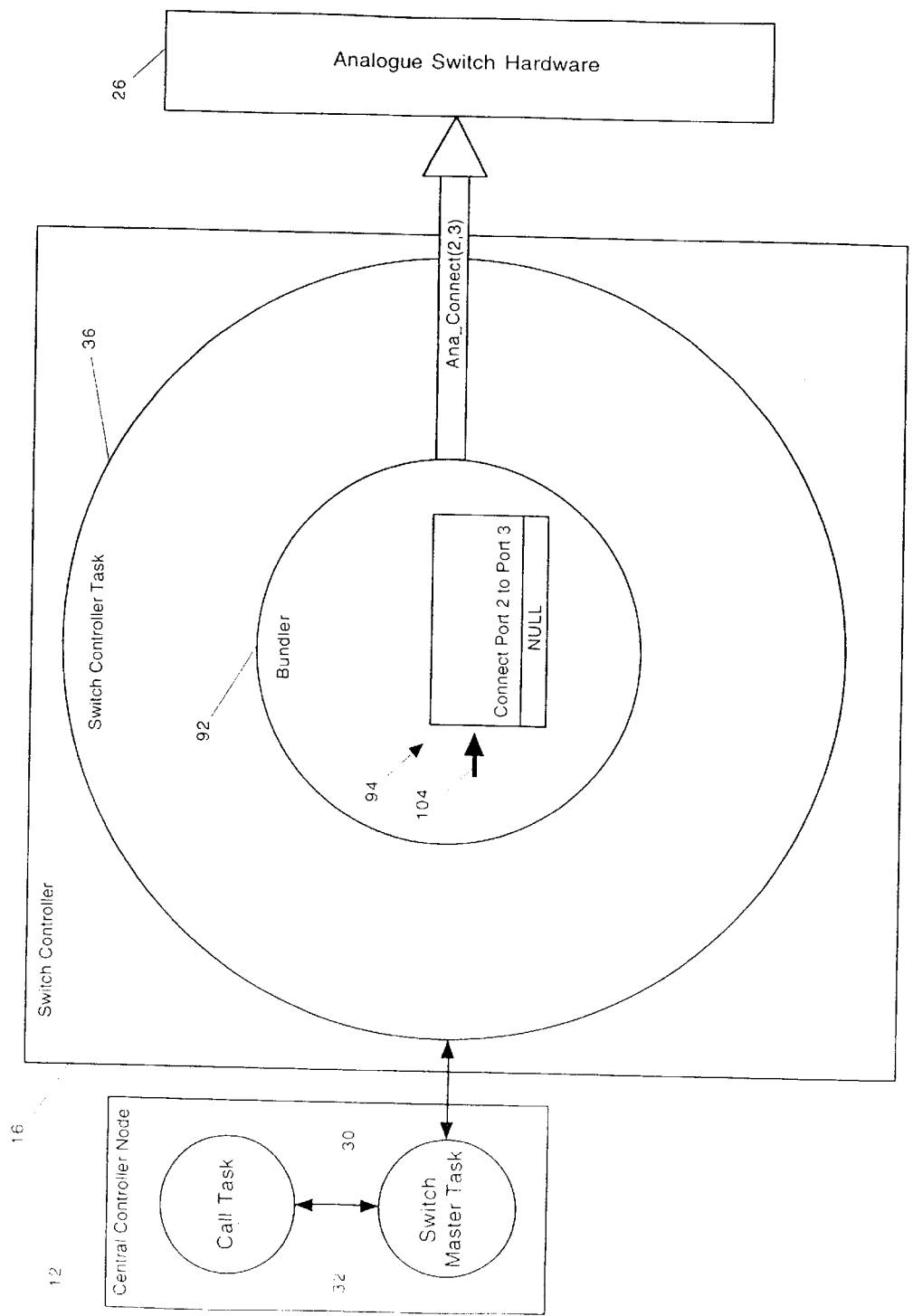

Referring to FIGS. 6a–c, an example of connecting bundles utilizing analogue switch 26 is depicted. When all the connections from the connections list 90 (FIG. 4) have been placed into a bundle, the bundler then asks each bundle to connect itself. Referring to FIG. 6a, as switch 26 is an analogue switch, each connection in the bundle of bundle list 94 must be connected separately. For illustrative purposes only, we shall assume that the instruction Ana__Connect(1,5) connects port 1 to port 5 on switch 26. Therefore, for the connection command Connect Port 1 to Port 5, the bundler 92 sends the instruction Ana__Connect(1,5) to switch 26. Similarly, referring to FIG. 6b, the connection command Connect Port 3 to Port 2 is sent from the bundler 92 to the switch 26 as Ana__Connect(3,2). Again, referring to FIG. 6c, the connection command Connect Port 2 to Port 3 is sent from the bundler 92 to the switch 26 as Ana__Connect(2,3).

Figure 7A:
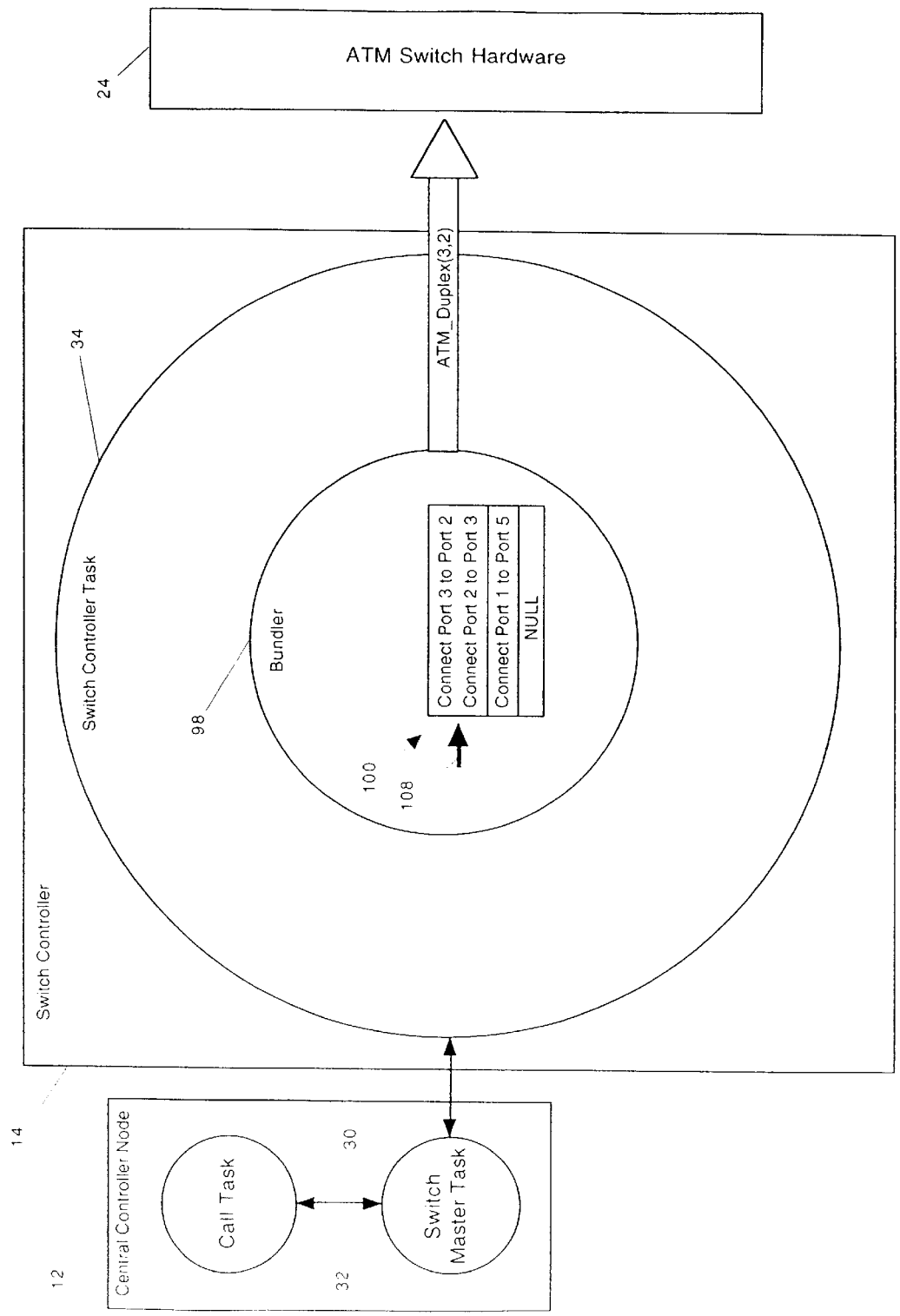
FIG. 7a–b are abstract block diagram representations of bundle connection communications between the Central Controller Node, Switch Controller and ATM Switch Hardware.
Figure 7B:
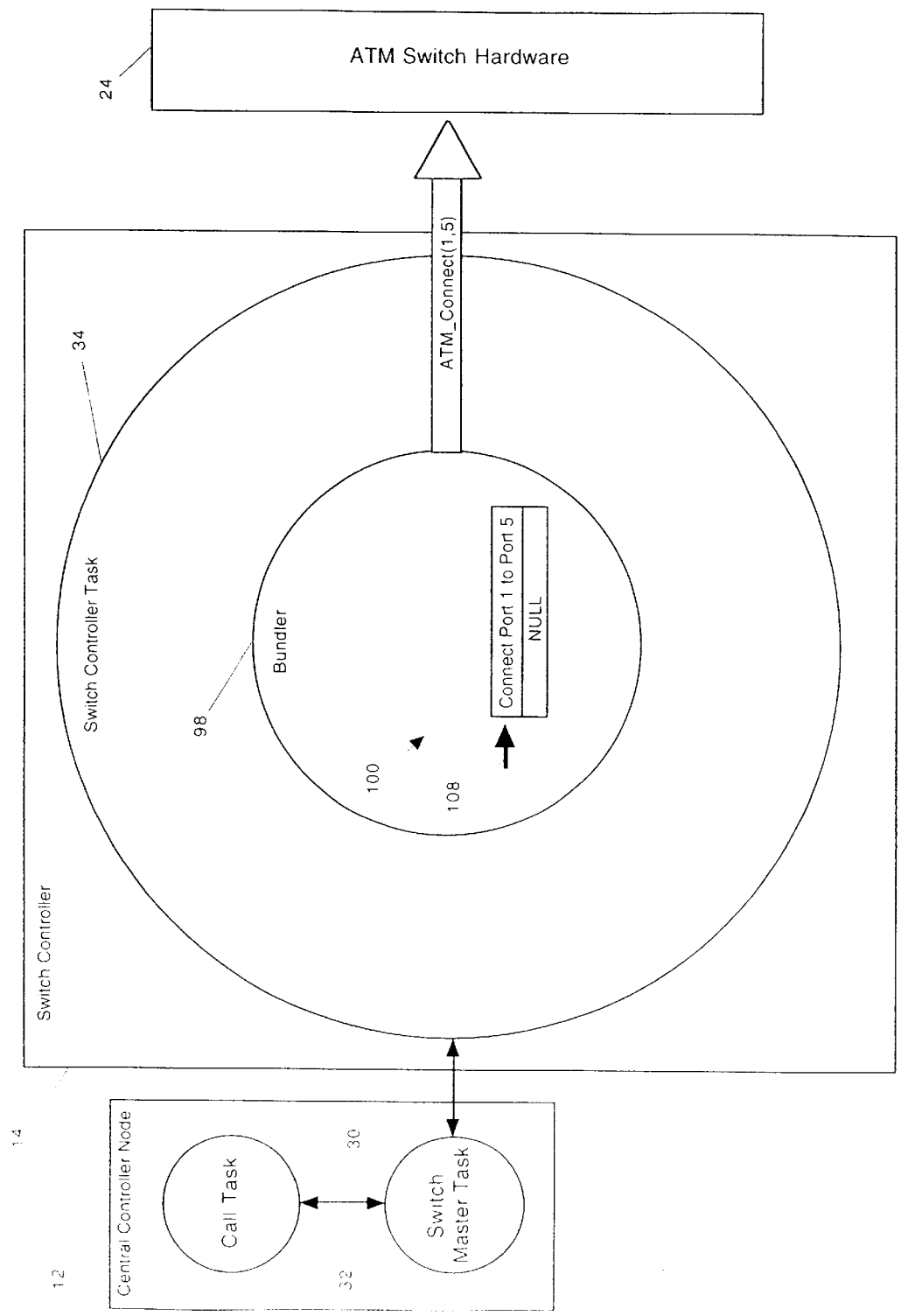

Referring to FIGS. 7a and 7b, we compare the connecting of bundles utilizing an ATM switch 24 as opposed to an analogue switch such as switch 26. For illustrative purposes only, we shall assume that the instruction ATM__Connect (1,5) connects port 1 to port 5 on switch 24 and the instruction ATM Duplex(3,2) connects port 3 to port 2 and port 2 to port 3. Bundles pointer 108 points to the first bundle of bundles list 100, the bundler knows that it is communicating with an ATM switch 24 therefore the bundles can contain a plurality of related connections. The two connections in the first bundle make up a duplex connection, therefore, on an ATM switch the two connections can be executed as a single instruction. As such, the connection commands Connect Port 3 to Port 2 and Connect Port 2 to Port 3 from the first bundle, are sent from the bundler 98 to switch 24 as the instruction ATM-Duplex(3,2). Referring to FIG. 7b, the bundles pointer is moved to the next bundle in the bundles list 100 and the previous bundle is removed from the bundles list 100. The current bundle is then asked by the bundler 98 to connect itself. The connection command Connect Port 1 to Port 5 is sent from the bundler 98 to switch 24 as the instruction ATM__Connect(1,5).

Referring again to FIG. 3, the component of the bundler that determines which connections should be bundled together (step 62) is switch specific code rather than part of the framework code. This way, each switch controller implementor can choose the connections (if any) that will be bundled together as appropriate for the switch being controlled.

Similarly, the component that converts the simplex connections within each bundle into hardware specific commands (step 70) is switch specific code rather than a part of the framework code.

The framework code (steps 50 to 88, excluding steps 62 and 70) is consistent regardless of the specific switch hardware that is implemented. In this way, different kinds of switches can be supported from a single code base. Therefore, improvements to the framework code can be applied to all of the switch controllers without having to alter each switch controller individually.

An implementation of the framework code is include in Appendix A. This appendix includes switch specific code for analog switches or switches that do not utilize a variety of bundles.

The advantages to using bundles are their modifiability and extensibility. The modifiability of bundles allows changes to be made to the bundles implementation without affecting the rest of the network provided that the external behaviour is preserved. Moreover, the extensibility of bundles allows new switch types or switches of new manufacturers to be implemented and supported simply by creating hardware specific code for the claim__connection and connect__bundle portions of the bundle code.

APPENDIX A

```
/*
 * $Header: /home/wavecm/flex/swcp/fwk/include/SCF_Bundle.h,v 16.3 1997/01/30 23:37:51 mar
sonia Exp $
 *
 *                    SCF_bundle.h
 * Description:
 * This class is used to group the atomic (simplex) connection requests
 * between a pair of ports into topological groups. Switch controllers
 * which talk to switches that need such topological information when setting
 * up connections should override the methods of this class.
```

APPENDIX A-continued

```
*
* $Log: SCF_Bundle.h,v $
* Revision 16.3 1997/01/30 23:37:51 marsonia
* changed some comments.
*
* Revision 16.2 1997/01/16 03:39:31 waespe
* claimConnection is no longer const, m_pcall is now protected rather
* than private.
*
* Revision 16.1 1996/12/17 21:16:57 marsonia
* Made all likely be virtual function virtual.
*
* Revision 1.1 1996/12/17 17:44:09 marsonia
* Initial revision
*
*/
#ifndef __SCF_BUNDLE_H
#define __SCF_BUNDLE_H
#include "SCF_Classes.h"
#include <<rw/tpdlist.h>
#ifndef DEFAULT_TYPE
#define DEFAULT_TYPE
typedef int DefaultType;
#endif
class SCF_Bundle
{
public:
    //----------------------------------------------------------
    // Constructor
    //
    // Arguments:
    //   pcall: the call associated with this bundle
    //----------------------------------------------------------
    SCF_Bundle( const SCF_Call* pcall );
    //----------------------------------------------------------
    // Destructor
    //
    // Deletes all Connections found in bundle before deleting itself
    //----------------------------------------------------------
    virtual ~SCF_Bundle( );
    //----------------------------------------------------------
    // Equivalency operator
    //
    // Arguments:
    //    pCall pointer to the bundle we wish to compare.
    // Returns:
    //    true if the WAVE Ids matches
    //----------------------------------------------------------
    int operator==( const SCF_Bundle& pBundle ) const;
    //----------------------------------------------------------
    // Returns:
    //   A pointer to the Call bundle belongs to else returns NULL.
    //----------------------------------------------------------
    SCF_Call* getCall( void ) const;
    //----------------------------------------------------------
    // Gets the number of SCF_Connections in this bundle
    //
    // Returns:
    //   the number of SCF_Connections in this bundle
    //----------------------------------------------------------
    int getNumConnections( void ) const ;
    //----------------------------------------------------------
    // Decides whether bundle should claim this Connection.
    //
    // Arguments:
    //   pconnection:   SCF_Connection in question
    //
    // Returns:
    //   non-zero value if the connection would be accepted by this bundle
    //----------------------------------------------------------
    virtual int claimConnection( const SCF_Connection* pconnection );
    //----------------------------------------------------------
    // Returns:
    //   non-zero (TRUE) if the connection is in the bundle
    //----------------------------------------------------------
    int isInBundle( const SCF_Connection * pConnection);
    //----------------------------------------------------------
    // Adds a SCF_connection to the list of connections.
    //
```

APPENDIX A-continued

```
    // Arguments:
    // pConnection: the connection we want to add to the list of
    //      connections
    //
    // Returns:
    //   non-zero value if the list of connections were succesfully added to
    // the bundle
    //-----------------------------------------------------------
    virtual int addConnection( SCF_Connection* pConnection );
    //-----------------------------------------------------------
    // Removes a SCF_Connection from the list of connection found in bundle.
    //
    // Arguments:
    //   pConnection:          the connection that is to be removed
    //
    // Return:
    //   non-zero value if the connection was successfully removed.
    //-----------------------------------------------------------
    virtual int removeConnection( SCF_Connection *pConnection );
    //-----------------------------------------------------------
    // Connects connections that are listed in the bundle
    //
    // Arguments:
    //    connectionList: the list of connections desired.
    //
    // Returns:
    //    TRUE if all the connection where made. otherwise FALSE.
    //-----------------------------------------------------------
    virtual int connect( RWTPtrDlist<SCF_Connection>& connectList );
    //-----------------------------------------------------------
    // Disconnects connections that are listed in the bundle
    //
    // Arguments:
    //    removalList: the list of connections desired.
    //
    // Returns:
    //    TRUE if all the connection where made. otherwise FALSE.
    //-----------------------------------------------------------
    virtual int disconnect( RWTPtrDlist<SCF_Connection>& removalList );
protected:
    RWTPtrDlist<SCF_Connection>    m_connections;
    SCF_Call*                       m_pcall;
private:
    static long                     m_gnextSerialNumber;
    long                            m_mySerialNumber;
};
#endif
/*
 * $Header: /home/wavecm/flex/swcp/fwk/fwkscf/SCF_Bundle.C,v 16.1 1997/01/16 03:37:59 waes
pe Exp $
 *
 *                SCF_Bundle.C
 * Description:
 * This class is used to group the atomic (simplex) connection requests
 * between a pair of ports into topological groups. Switch controllers
 * which talk to switches that need such topological information when setting
 * up connections should override the methods of this class.
 *
 * $Log: SCF_Bundle.C,v $
 * Revision 16.1 1997/01/16 03:37:59 waespe
 * claimConnection is no longer const.
 *
 * Revision 1.1 1996/12/17 17:59:32 marsonia
 * Initial revision
 *
 *
 *
 */
#include "SCF_Call.h"
#include "SCF_Bundle.h"
#include "SCF_Connection.h"
#include "SCF_Port.h"
#include "SCF_Trace.h"
#include <assert.h>
// Initialize the reference counter
long SCF_Bundle::m_gnextSerialNumber = 0;
//-----------------------------------------------------------
// Constructor
//
// Arguments:
```

APPENDIX A-continued

```
// pcall:      the call associated with this bundle
//----------------------------------------------------------
SCF_bundle::SCF_Bundle( const SCF_Call* pcall )
        m_connections( )
{
    TRACE_STACK("SCF_Bundle::SCF_Bundle");
    m_pcall = (SCF_Call*) pcall;
    // Set the serial number for the current instance and increment the
    // global serial nubber
    m_mySerialNumber = m#gnextSerialNumber;
    m_gnextSerialNumber++;
    uint callId = pcall->getWaveId( );
    TSK_DEBUG ( 60, ( cerr << endl << "Creating new bundle in call:"
                                   << callId;));
}
//----------------------------------------------------------
// Destructor
// Removes itself from any list it may belong to befor destroying
// itself.
//----------------------------------------------------------
SCF_Bundle::~SCF_Bundle ( )
{
    TRACE_STACK ("SCF_Bundle::~SCF_Bundle");
    uint callId = m_pcall->getWaveId( );
    TSK_DEBUG( 60, ( cerr << "Deleting Bundle in Call: "
                          << callId << flush;));
    // have to remove all bundles
    while (!m_connections. empty( ))
       delete (m_connections.removeFirst( ));
    m_pcall->removeBundle( this );
}
//----------------------------------------------------------
// Equivalency operator
//
// Arguments:
//      pCall pointer to the bundle we wish to compare.
// Returns:
//      true if the WAVE Ids matches
//----------------------------------------------------------
int
SCF_Bundle::operator==( const SCF_Bundle& pBundle ) const
{
    TRACE_STACK( "SCF_Connection::operator==" );
    return ( m_mySerialNumber == pBundle.m_mySerialNumber );
}
//----------------------------------------------------------
// Returns:
//   A pointer to the Call bundle belongs to else returns NULL.
//----------------------------------------------------------
SCF_Call *
SCF_Bundle::getCall( void ) const
{
    TRACE_STACK("SCF_Connection::getCall");
    return m_pcall;
}
//----------------------------------------------------------
// Gets the number of SCF_Connections in this bundle
//
// Returns:
// the number of SCF_Connections in this bundle
//----------------------------------------------------------
int
SCF_Bundle::getNumConnections( void ) const
{
    TRACE_STACK( "SCF_Bundle::getNumConnections");
    return ( m_connections.entries( ) );
}
//----------------------------------------------------------
// Decides whether bundle should claim this Connection
//
// Arguments:
// pconnection:      SCF_Connection in question
//
// Returns:
//   non-zero value if the connection would be accepted by this bundle
//----------------------------------------------------------
int
SCF_Bundle::claimConnection(* const SCF_Connection* /*pconnection*/ )
{
```

APPENDIX A-continued

```
        TRACE_STACK("SCF_Bundle::claimConnection");
        return (TRUE);
}
//----------------------------------------------------------
// Returns:
//    non-zero (TRUE) if the connection is in the bundle
//----------------------------------------------------------
int
SCF_Bundle::isInBundle( const SCF_Connection * pConnection)
{
        TRACE_STACK ("SCF_Bundle::isInBundle");
        return (int) m_connections.contains (pConnection);
}
//----------------------------------------------------------
// Adds a SCF_connection to the list of connections.
//
// Arguments:
// pConnection:  the connection we want to add to the list of connections
//
// Returns:
//    non-zero value if the list of connections were succesfully added to
//    the bundle
//----------------------------------------------------------
int
SCF_Bundle:addConnection( SCF_Connection* pConnection )
{
        TRACE_STACK("SCF_Bundle::addConnection");
        // want to make sure that connection isn't already in the list
        assert( m_connections.find(pConnection) == NULL);
        pConnection->setBundle( this ) ;
        m_connections.append (pConnection);
        return TRUE;
}
//----------------------------------------------------------
// Removes a SCF_Connection from the list of connection found in bundle.
//
// Arguments:
//    pConnection: The connection that is to be removed.
//
// Return:
//    non-zero value if the connection was successfully removed.
//----------------------------------------------------------
int
SCF_Bundle::removeConnection( SCF_Connection *pConnection )
{
        TRACE_STACK ( "SCF_Bundle::removeConnections" );
        int returnValue = TRUE;
        if ( ( ( pConnection->getStatus( ) == SCF_Connection::connected_v ) ||
             ( pConnection->getStatus( ) == SCF_Connection::disconnected_failed_v ))
        {
            returnValue = FALSE;
        }
        else
        {
            assert( m_connections.remove ( pConnection ) );
            pConnection->setBundle (NULL );
            if ( m_connections.isEmpty( ) )
                delete this;
        }
        return returnValue;
}
//----------------------------------------------------------
// Connects connections that are listed in the bundle
//
// Arguments:
//    connectionList: the list of connections desired.
//
// Returns:
//    TRUE if all the connection where made. otherwise FALSE.
//----------------------------------------------------------
int
SCF_Bundle::connect( RWTPtrDlist<SCF_Connection>& connectList )
{
        TRACE_STACK("SCF_Bundle::connect");
        int returnValue = TRUE;
```

APPENDIX A-continued

```
    RWTPtrDlistIterator<SCF_Connection> connectListIterator( connectList );
    SCF_Connection* pCurrentConnection;
    while( ( pCurrentConnection = connectListIterator( ) ) != NULL )
    {
        // Connection should already existed in bundle
        assert (isInBundle ( pCurrentConnection ));
        if ( pCurrentConnection->checkForLocks( ) == FALSE )
        {
            if ( !pCurrentConnection->connect( ) )
                returnValue = FALSE;
        }
        else
        {
            int sourceId = pCurrentConnection->getSourcePort( )->getWaveId( ) ;
            int sinkId = pCurrentConnection->getSinkPort( )->getWaveId( ) ;
            TSK_DEBUG ( 3 ,
                        { cerr << endl << "Port:" << sinkId
                               << " is locked can't connect ports:"
                               << sinkId << ":" << sourceId << flush;
                        }};
            returnValue = FALSE;
        }
    }
    return returnValue;
}
//---------------------------------------------------------
// Disconnects connections that are listed in the bundle
//
// Arguments:
//   removalList: the list of connections desired.
//
// Returns:
//   TRUE if all the connection where made. otherwise FALSE.
//---------------------------------------------------------
int
SCF_Bundle::disconnect( RWTPtrDlist<SCF_Connection>& removalList )
{
    TRACE_STACK("SCF_Bundle:disconnect");
    int returnValue = TRUE;
    SCF_Connection* *pCurrentConnection;
    while( pCurrentConnection = removalList.removeFirst( ) )
    {
        // Connection should already be in bundle
        assert( isInBundle( pCurrentConnection ) );
        if ( pCurrentConnection->checkForLocks( ) == FALSE )
        {
            if ( !pCurrentConnection->disconnect( ) )
                returnValue = FALSE;
        }
        else
        {
            int sourceId = pCurrentConnection->getSourcePort( )->getWaveId( ) ;
            int sinkId = pCurrentConnection->getSinkPort( )->getWaveId( ) ;
            TSK_DEBUG ( 3 ,
                        {
                            cerr << endl << "Port:" << sinkId
                                 << " is locked can't disconnect ports:"
                                 << sinkId << ":" sourceId << flush;
                        }};
            returnValue = FALSE;
        }
    }
    return returnValue;
}
```

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

The embodiments of the invention in which an exclusive property or privilege is claimed are defined as follows:

1. A method of making connections in a network, comprising:

a) generating a list of connection commands for a desired hardware switch in a generic format independent of the types of hardware switches present in said network;

b) placing the connection commands in said list into at least one bundle wherein said connection commands in said one bundle are related;

c) converting said connection commands in said one bundle into hardware specific commands operative to implement said connection commands in said hardware switch.

2. A method according to claim 1, wherein said types of hardware switches include both analogue and digital switches.

3. A method according to claim 2 wherein said hardware switches are ATM switches.

4. A method according to claim 1, wherein said hardware switches have a plurality of different protocols and different connections.

5. A method according to claim 1, wherein step b) includes the steps of:
   a) offering an Nth one of said connection commands from said list to said one bundle, where N is a positive integer greater than or equal to unity;
   b) placing said Nth connection command, if claimed, in said one bundle;
   c) if said Nth connection command is not claimed by said one bundle and a second bundle exists, offering said Nth connection command to said second bundle;
   d) repeating step c) for all existing bundles until said Nth connection command is claimed;
   e) if said Nth connection command is not claimed or if no other bundles exist, creating another bundle and placing said Nth connection command into said another bundle; and
   f) repeating steps a) to e) for values of N in sequence for 1 up to the number of connection commands in said list.

6. A method of making connections in a network, comprising:
   a) generating a list of connection commands for a desired hardware switch in a generic format independent of types of hardware switches in said network;
   b) placing the connection commands in said list into bundles wherein said connection commands in each of said bundles are related;
   c) converting said connection commands in said bundles into hardware specific commands operative to implement said connection commands in said hardware switch.

7. A method according to claim 6, wherein said types of hardware switches include both analogue and digital switches.

8. A method according to claim 7 wherein said hardware switches are ATM switches.

9. A method according to claim 6, wherein said hardware switches have a plurality of different protocols and different connections.

10. A method according to claim 6, wherein step b) includes the steps of:
    a) offering an Nth one of said connection commands from said list to a first one of said bundles, where N is a positive integer greater than or equal to unity;
    b) placing said Nth connection command, if claimed, in said first one of said bundles;
    c) if said Nth connection command is not claimed by said first one of said bundles, offering said Nth connection command to a second one of said bundles;
    d) repeating step c) for all existing bundles until said Nth connection command is claimed;
    e) if said Nth connection command is not claimed or if no other of said bundles exist, creating another one of said bundles and placing said Nth connection command into said another of said bundles; and
    f) repeating steps a) to e) for values of N in sequence from 1 up to the number of connection commands in said list.

* * * * *

UNITED STATES PATENT AND TRADEMARK OFFICE
CERTIFICATE OF CORRECTION

PATENT NO. : 6,865,180 B1  
APPLICATION NO. : 09/590326  
DATED : March 8, 2005  
INVENTOR(S) : Waespe Page 1 of 1

It is certified that error appears in the above-identified patent and that said Letters Patent is hereby corrected as shown below:

Column 8, line 42, delete "include", replace with -- included --.
Column 9, line 20, delete "<".
Column 13, line 9, delete "nubber", replace with -- number --.
Column 13, line 10, delete "m#gnextSerialNumber", replace with
-- m_gnextSerialNumber --.
Column 13, line 18, delete "befor", replace with -- before --.
Column 13, line 28, add -- is -- before "empty".
Column 15, line 69, delete "where", replace with -- were --.
Column 17, line 5, delete "existed", replace with -- exist --.
Column 17, line 20, delete "}", replace with -- ) --.

Signed and Sealed this

Fifteenth Day of January, 2008

JON W. DUDAS  
*Director of the United States Patent and Trademark Office*